INTEGRAL TRANSISTOR-THERMISTOR AND CIRCUIT USING SAME FOR COMPENSATING FOR CHANGING TRANSISTOR TEMPERATURE

Filed July 1, 1960

INVENTOR.
JOSEPH T. MAUPIN
BY Omund R. Dahle
ATTORNEY 3,017,520
INTEGRAL TRANSISTOR-THERMISTOR AND CIRCUIT USING SAME FOR COMPENSATING FOR CHANGING TRANSISTOR TEMPERATURE Joseph T. Maupin, Deephaven, Minn., assignor to Minneapolis-Honeywell Regulator Company, Minneapolis, Minn., a corporation of Delaware Filed July 1, 1960, Ser. No. 40,268
9 Claims. (Cl. 307—88.5)

The present invention relates generally to an improved semiconductor electrical translating device such as a junction type transistor. More specifically, this invention relates to an improved junction type tetrode transistor having internal temperature compensation. In one particular embodiment, this invention relates to a specific type of tetrode semiconductor device having a pair of oppositely disposed junction zones and a pair of low resistance nonjunction contacts, and in which a block of temperature sensitive material such as high resistivity single crystalline or polycrystalline germanium is affixed to one of the low resistance contacts, this resistance element having a large temperature coefficient.

The problem of thermal runaway in the operation of transistors is well recognized. One method of compensating for this undesirable temperature instability is in providing a variable bias controlled as a function of temperature, for example, by the use of a negative temperature coefficient resistor in the bias network. Because of the large temperature coefficient necessary, these elements are usually made of semiconducting material. The transistor disclosed in this invention has a negative temperature coefficient resistance block of germanium mounted internally on the semiconductive base wafer at one of the two base electrodes. This location markedly increases the response and sensitivity to sudden local rises in temperature at the junction within the transistor due to transistor dissipation.

It is therefore an object of this invention to provide an improved tetrode transistor configuration including internal temperature compensating elements.

It is a more specific object of this invention to provide an improved tetrode transistor device having a relatively high temperature coefficient compensating element mounted on one of the base connections.

It is a further specific object of this invention to provide a tetrode transistor wherein a piece of semiconductor material having a high temperature coefficient of resistance is attached to a base connection within the transistor.

These and other objects of the invention will become more apparent upon a consideration of the accompanying specification, claims and drawing of which:

Figure 1:
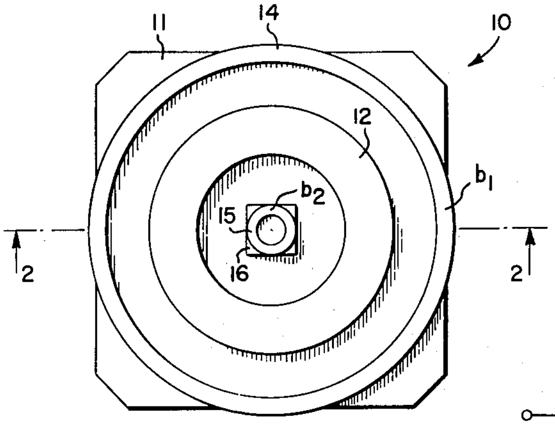
FIGURE 1 is a diagrammatical representation of the transistor of the invention.
Figure 2:
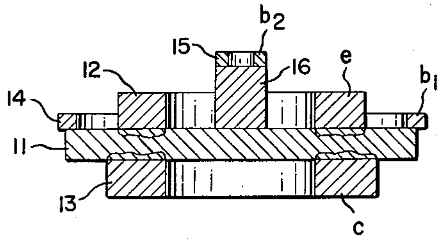
FIGURE 2 is a cross section of the device of FIGURE 1.

Turning now to FIGURES 1 and 2, there is disclosed a preferred modification of the present invention in which there is provided a transistor of the tetrode type generally designated 10. This transistor includes a semiconductor base member or wafer 11 having mounted thereon a pair of oppositely disposed junction elements comprising an emitter electrode 12 and a collector electrode 13. The device also discloses a pair of base electrodes ($b_1$ and $b_2$) 14 and 15 which make low resistance nonjunction contact with the wafer body.

The transistor as described up to this point may be constructed in a manner as described in my copending application entitled "Semiconductor Devices," Serial No. 556,210, filed December 29, 1955, except that the inner base connection $b_2$ is mounted on a block of temperature sensitive material such as a thermistor type of poly or single crystalline germanium 16, which is soldered onto the base wafer beneath the inner base connection $b_2$. Various resistivities and resistance values of thermistors have been tested and an example of one such thermistor tested is a germanium block with a resistivity of 25 ohm-centimeters and a resistance value of 72 ohms at 25° C.

Figure 3:
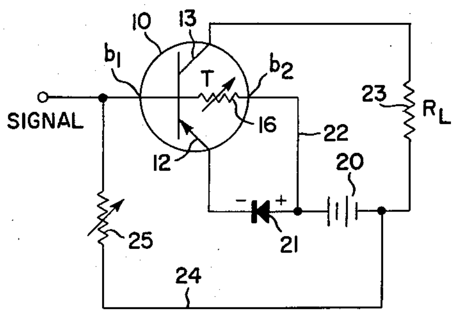
FIGURE 3 is a schematic representation of the device of FIGURE 1 and associated circuitry.

FIGURE 3 discloses an improved transistor as connected in a basic circuit. A source of energy such as a battery 20 has its positive terminal connected through a diode 21, such as a silicon diode, which has a relatively constant forward voltage drop, to the emitter electrode 12. The positive terminal of the source 20 is also directly connected by the conductor 22 to the inner base electrode $b_2$. The negative terminal of the source 20 is connected through a suitable load device 23, here shown as a resistive element, to the collector electrode 13. The negative terminal of the source is also connected by way of a conductor 24 and a bias adjusting resistor 25 to the other base electrode $b_1$. A signal to be amplified may be applied between the emitter 12 and one or more of the base electrodes. In connection with FIGURE 3, it will be noted by referring to FIGURE 1, that the base connections $b_1$ and $b_2$ are so positioned on the base wafer 11 that the emitter and collector junctions are positioned between them. A resistive current path exists between the two base connections with the majority of the base resistance being in the bridge area between the collector and emitter junctions. Considering again FIGURE 3, a transverse current path may be traced through the transistor from the positive terminal of the source through conductor 22 to the base connection $b_2$ through the thermistor 16 across the base wafer area to the outer base connection $b_1$ and through the bias controlling resistor 25 to the negative terminal of the battery. It will be further noted that the diode 21 provides a reverse bias between the base connection $b_2$ and the emitter 12. The reverse potential across the junction is in a direction which is opposite to the direction of easy current flow of the emitter-base rectifying junction. This reverse potential is in a direction to tend to maintain the transistor cut off. The base electrode $b_1$, on the other hand, is connected to a negative potential point through the biasing resistor 25, and this biasing circuit is in a direction to turn the transistor on. This is generally shown diagrammatically in FIGURE 4 where a portion of the emitter adjacent $b_2$ is shown back biased off and a further portion adjacent $b_1$ is biased on.

Figure 4:
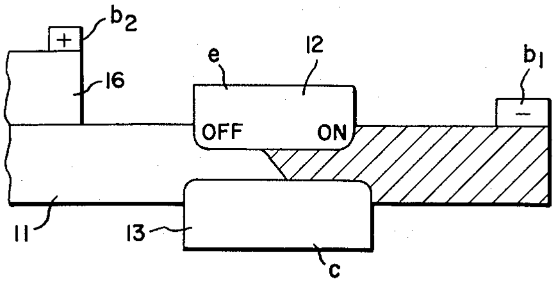
FIGURE 4 is a diagrammatical representation of a portion of the junction transistor of FIGURE 2 showing representative potentials at various points of the device.

As is well known, the majority of the heat occurring within the transistor is generated at the collector junction. The collector junction leakage current is temperature sensitive and tends to double every 9° C. temperature increase above 25° C. This tends to cause the transistor output current to vary widely with temperature. In this device, the thermistor 16, which is mounted in close proximity with the collector junction by being mounted on the base wafer within the annulus of the collector junction, responds very quickly to the collector junction temperature. As the collector junction temperature rises, which tends to cause the output current to increase, the thermistor having a negative temperature coefficient decreases in resistance, causing the voltage gradient as shown in FIGURE 4 to shift to the right whereby an additional portion of the emitter-base junction is biased in the reverse or cut off direction. The conduction of the transistor is thereby reduced to compensate for the increase in leakage current due to the increased temperature of the collector junction. By proper choice of the size of the resistance and of the resistivity of material, it is possible to provide a self-compensated transistor device. Undercompensation or overcompensation may also be accomplished by choice of the characteristics of the thermistor material.

Modifications of this invention will undoubtedly occur to those who are skilled in the art and I therefore wish it to be understood that I intend to be limited only by the scope of the appended claims and not by the specific embodiment of the invention which is disclosed herein for the purpose of illustration only.

I claim as my invention:

1. A semiconductive device comprising a body of semiconductive material having collector, emitter and base electrodes, said collector and emitter making junction contact with said body and said base electrode making ohmic nonjunction contact therewith; a relatively high resistivity germanium block having a high temperature coefficient of resistance in contact with said body at said base electrode, said block being in good thermal relation to the collector junction so that the resistance of said block reflects the temperature of said collector junction.

2. A transistor device device comprising a body of semiconductive material having a collector and an emitter making junction contact therewith and having a pair of base electrodes making ohmic nonjunction contact therewith said base electrodes being separated on said body by said emitter and collector electrode; a relatively high resistivity germanium block having a high temperature coefficient of resistance in contact with said body at one of said base electrodes, said block being in good thermal relation to the collector junction so that the resistance of said block reflects the temperature of said collector junction.

3. A semiconductive device comprising a body of semiconductive material having collector, emitter and base electrodes, said collector and emitter making junction contact with said body and said base electrode making ohmic nonjunction contact therewith; said collector electrode encircling said base electrode on said body; a relatively high resistivity germanium block having a high temperature coefficient of resistance in contact with said body at said base electrode, said block being in good thermal relation to the encircling collector junction so that the resistance of said block reflects the temperature of said collector junction.

4. A transistor device comprising a body of semiconductive material having a collector and an emitter making junction contact therewith and having a pair of base electrodes making ohmic nonjunction contact therewith said base electrodes being separated on said body by said emitter and collector electrode, said collector electrode encircling said one base electrode; a relatively high resistivity germanium block having a high temperature coefficient of resistance in contact with said body at said one base electrode, said block being in good thermal relation to the encircling collector junction so that the resistance of said block reflects the temperature of said collector junction.

5. Semiconductor apparatus comprising a semiconductor device having a body member and having emitter, collector and base electrodes, said emitter and collector electrodes making junction contact with said body, bias means adapted to be connected to said emitter and base electrodes, a block of resistive semiconductive material having a relatively high temperature coefficient of resistance mounted on said body, means affixing said base electrode to said block whereby the current from said body to said base electrode flows through said resistive block, the resistance of said block varying with the temperature of said collector junction so that the bias current is thereby adjusted to compensate said device for leakage current.

6. Semiconductor apparatus comprising a semiconductor device having a body member and having emitter, collector and first and second base electrodes, said emitter and collector electrodes making junction contact with said body, bias means adapted to be connected to said emitter and said base electrodes, a block of resistive semiconductive material having a relatively high temperature coefficient of resistance mounted on said body, said block being encircled by said collector and emitter electrodes to provide good thermal heat transfer between said collector and said block, means affixing said base electrode to said block whereby the current from said body to said base electrode flows through said resistive block, the resistance of said block varying with the temperature of said collector junction so that the bias current between said first and second base electrodes is thereby adjusted to compensate said device for leakage current.

7. Semiconductor apparatus comprising a semiconductor device having a body member and having emitter, collector and base electrodes, said emitter and collector electrodes making junction contact with said body, bias means adapted to be connected to said emitter and base electrodes, a second body comprising a temperature sensitive semiconductor block of relatively high resistivity and having a high temperature coefficient of resistance mounted on said body, means affixing said base electrode to said block whereby the current from said body to said base electrode flows through said resistive block, the resistance of said block varying with the temperature of said collector junction so that the bias current is thereby adjusted to compensate said device for leakage current.

8. A temperature compensated semiconductor amplifier including a wafer of semiconductor material having a pair of parallelly disposed major surfaces, a major portion of said wafer being of a first conductivity type and including an emitter junction and a collector junction situated in oppositely disposed relation on said major surfaces and defining a relatively thin bridge region of said first conductivity type therebetween, a pair of ohmic base contacts making contact with said wafer on opposite sides of said junctions and bridge region, a further semiconductor body having a relatively high resistivity and having a high temperature coefficient of resistance affixed to said wafer at one of said base contacts, said body being in good heat transfer relation with respect to said collector junction whereby the resistance of said body is a function of the temperature of said collector junction.

9. A temperature compensated semiconductor amplifying device including a wafer of semiconductor material having first and second parallelly disposed major surfaces, said first major surface including a first ohmic contact and an emitter junction area arranged thereon, said area being of substantially opposite conductivity type and having a substantially annular configuration enclosing said first ohmic contact, a collector junction area of said opposite conductivity type being situated in oppositely disposed relation to said emitter junction area on said second major surface and defining a relatively thin bridge region of said first conductivity type therebetween, a further semiconductor body having a relatively high resistivity and having a high temperature coefficient of resistance affixed to said wafer at said one ohmic contact, said body being in good heat transfer relation with respect to said collector junction which encircles it whereby the resistance of said body is a function of the temperature of said collector junction.

References Cited in the file of this patent

FOREIGN PATENTS 1,063,713 Germany ______________ Aug. 20, 1959